US012704146B2

(12) United States Patent
Kojima et al.

(10) Patent No.: US 12,704,146 B2
(45) Date of Patent: Aug. 11, 2026

(54) METHOD FOR FASTENING PIERCING NUT TO STACKED BODY OF PLATE-SHAPED WORKPIECES

(71) Applicant: Aoyama Seisakusho CO., LTD., Aichi (JP)

(72) Inventors: Tsuyoshi Kojima, Aichi (JP); Kazuki Akatsuka, Aichi (JP); Kouji Murakami, Aichi (JP); Kenichirou Araki, Aichi (JP); Naoki Shimada, Aichi (JP)

(73) Assignee: Aoyama Seisakusho CO., LTD., Niwa-gun (JP)

( * ) Notice: Subject to any disclaimer, the term of this patent is extended or adjusted under 35 U.S.C. 154(b) by 358 days.

(21) Appl. No.: 18/563,369

(22) PCT Filed: Jun. 23, 2022

(86) PCT No.: PCT/JP2022/025059
§ 371 (c)(1),
(2) Date: Nov. 21, 2023

(87) PCT Pub. No.: WO2023/286558
PCT Pub. Date: Jan. 19, 2023

(65) Prior Publication Data

US 2024/0288023 A1 Aug. 29, 2024

(30) Foreign Application Priority Data

Jul. 12, 2021 (JP) ................................ 2021-115066

(51) Int. Cl.
*F16B 37/04* (2006.01)
*F16B 39/22* (2006.01)

(52) U.S. Cl.
CPC ............. *F16B 37/04* (2013.01); *F16B 39/22* (2013.01)

(58) Field of Classification Search
CPC .... F16B 37/068; F16B 37/062; F16B 39/282; F16B 37/04; F16B 39/22; F16B 39/00
See application file for complete search history.

(56) References Cited

U.S. PATENT DOCUMENTS 3,921,276 A * 11/1975 Oaks .................... B23P 19/062 29/432
2019/0242417 A1* 8/2019 Pirvulescu ............ B21J 15/025

FOREIGN PATENT DOCUMENTS

| | | | |
|---|---|---|---|
| CN | 210435282 | U | 5/2020 |
| JP | 2002089529 | A | 3/2002 |
| JP | 2014-88936 | A | 5/2014 |

OTHER PUBLICATIONS

The first office action of the corresponding CN application No. 202280045517.5 issued Apr. 2, 2026 and English translation thereof.

* cited by examiner

*Primary Examiner* — Zakiya W Bates
(74) *Attorney, Agent, or Firm* — Muncy, Geissler, Olds & Lowe, P.C.

(57) ABSTRACT

A fastening method capable of fastening a piercing nut to a stacked body in which a plurality of plate-shaped workpieces are stacked so as to develop a high fastening strength. A fastening method of a piercing nut 1 includes: a first clinching step of fastening a piercing nut 1 to a first plate-shaped workpiece $W_1$ by punching out the first plate-shaped workpiece $W_1$ in a circular shape, and extending a peripheral area of the punched portion in a circumferential cavity 4 of the piercing nut 1; and a second clinching step of punching out a second plate-shaped workpiece $W_2$ in a circular shape, and extending a peripheral area of the punched portion on an outside of an extended portion $W_{1f}$ of the first plate-shaped workpiece $W_1$ in the circumferential cavity 4 of the piercing nut 1.

5 Claims, 5 Drawing Sheets

(a)

(b)

(a)

(b)

(c)

(d)

METHOD FOR FASTENING PIERCING NUT TO STACKED BODY OF PLATE-SHAPED WORKPIECES

TECHNICAL FIELD

The present invention relates to a method for fastening a piercing nut with a screw hole to a plate-shaped workpiece.

BACKGROUND ART

As a conventional piercing nut, as disclosed in Patent Document 1, there has been known a piercing nut in which a screw insertion hole is provided by drilling in the center of a nut body formed in a flat columnar shape, the peripheral portion in the upper side of the screw insertion hole is formed in a cylindrical shape narrowing downward (that is, a cylindrical shape having a diameter gradually decreasing from the outside toward the inside), and an annular groove is provided outside the cylindrical shape.

Then, when such a piercing nut is fastened to a plate-shaped workpiece, a cylindrical clinching die having an inner diameter approximately the same as the cylindrical portion in the periphery of the screw insertion hole is driven from the opposite side of the piercing nut via the plate-shaped workpiece, thereby punching out the part abutting on the cylindrical portion of the piercing nut of the plate-shaped workpiece. Then, the peripheral portion of the punched part is pressed into the annular groove of the piercing nut and extended, and thus the plate-shaped workpiece is clinched to the piercing nut.

Patent Document 1: JP-A-2014-88936

DISCLOSURE OF THE INVENTION

Problems to be Solved by the Invention

However, when the piercing nut is fastened to two stacked plate-shaped workpieces (stacked body) using the fastening method as described above, the peripheral portion of the punched part of the outer plate-shaped workpiece is not sufficiently extended inside the annular groove of the piercing nut (outside the extended part of the inner plate-shaped workpiece), and this causes a situation in which the fastening force between the outer plate-shaped workpiece and the piercing nut decreases. Furthermore, when the clinching die is strongly driven (that is, strongly clinched) to increase the fastening force between the outer plate-shaped workpiece and the piercing nut, the part deformed by the extension of the outer plate-shaped workpiece is bent or broken. Then, the thinner the outer plate-shaped workpiece becomes, the more remarkable the tendency becomes.

It is an object of the present invention to solve the problem in the conventional method of fastening a piercing nut to two stacked plate-shaped workpieces (stacked body), and provide a fastening method capable of fastening a piercing nut to a stacked body in which a plurality of plate-shaped workpieces are stacked so as to develop a high fastening strength (high idling torque (resistance to rotational force), and high clinching force (pull-out resistance)).

Solutions to the Problems

In the present invention, an invention described in claim 1 is a fastening method for fastening a flat column-shaped piercing nut to a stacked body in which a plurality of plate-shaped workpieces are stacked. The piercing nut has a center provided with a cylindrical portion. A circumferential cavity is formed on a peripheral area of the cylindrical portion. The method includes: a first clinching step of fastening the piercing nut to a first plate-shaped workpiece by locating the piercing nut on one surface side of the first plate-shaped workpiece in a state of being opposed to an opening side of the circumferential cavity, driving a clinching die with a tubular distal end surface from another surface side of the first plate-shaped workpiece to punch out the first plate-shaped workpiece in a circular shape, and extending a peripheral area of the punched portion in the circumferential cavity of the piercing nut; and a second clinching step of stacking a second plate-shaped workpiece on the one surface side of the first plate-shaped workpiece to which the piercing nut is fastened in the first clinching step, subsequently, driving a clinching die with a tubular distal end surface from the side in which the second plate-shaped workpiece is stacked to punch out the second plate-shaped workpiece in a circular shape, and extending a peripheral area of the punched portion on an outside of the extended portion of the first plate-shaped workpiece in the circumferential cavity of the piercing nut.

In an invention described in claim 2, which is in the invention described in claim 1, the clinching die used in the first clinching step and/or the second clinching step has a distal end side formed in a truncated cone shape.

In an invention described in claim 3, which is in the invention described in claim 2, an inclination angle with respect to a vertical direction of a peripheral surface of the truncated cone shaped-portion of the clinching die used in the second clinching step is smaller than an inclination angle with respect to the vertical direction of a peripheral surface of the truncated cone shaped-portion of the clinching die used in the first clinching step.

In an invention described in claim 4, which is in the invention described in claim 2 or 3, an outer diameter of the distal end surface of the clinching die used in the second clinching step is smaller than an outer diameter of the distal end surface of the clinching die used in the first clinching step.

Effects of the Invention

With the method for fastening a piercing nut to a stacked body of plate-shaped workpieces (hereinafter simply referred to as a piercing nut fastening method) described in claim 1, the peripheral area of the punched portion of the second plate-shaped workpiece is extended alone on the outside of the extended portion of the first plate-shaped workpiece in the circumferential cavity of the piercing nut in the second clinching step. Therefore, a situation in which the extension is not sufficient, the portion deformed by the extension is broken, or the joint between the extended portion of the first plate-shaped workpiece and the extended portion of the second plate-shaped workpiece becomes insufficient does not occur. Accordingly, with the piercing nut fastening method described in claim 1, the piercing nut can be strongly fastened to the stacked first plate-shaped workpiece and second plate-shaped workpiece so as to develop a high idling torque and a high clinching force.

With the piercing nut fastening method described in claim 2, since the clinching die has a distal end side formed in a truncated cone shape, the peripheral areas of the punched portions of the first plate-shaped workpiece and the second plate-shaped workpiece can be smoothly extended in the circumferential cavity of the piercing nut without breaking in the first clinching step or the second clinching step.

Therefore, the piercing nut can be more strongly fastened to the stacked first plate-shaped workpiece and second plate-shaped workpiece.

With the piercing nut fastening method described in claim 3, in the second clinching step, the peripheral area of the punched portion of the second plate-shaped workpiece can deeply penetrate into the circumferential cavity of the piercing nut. Therefore, the peripheral area of the punched portion of the second plate-shaped workpiece can be more smoothly extended on the outside of the extended portion of the first plate-shaped workpiece in the circumferential cavity of the piercing nut so as to have the sufficient width. Accordingly, with the piercing nut fastening method described in claim 3, the piercing nut can be considerably strongly fastened to the stacked first plate-shaped workpiece and second plate-shaped workpiece.

With the piercing nut fastening method described in claim 4, in the second clinching step, the peripheral area of the punched portion of the second plate-shaped workpiece can more deeply penetrate into the circumferential cavity of the piercing nut. Therefore, the peripheral area of the punched portion of the second plate-shaped workpiece can be considerably smoothly extended between the extended portion of the first plate-shaped workpiece and the clinching die used in the second clinching step. Accordingly, with the piercing nut fastening method described in claim 4, the piercing nut can be extremely strongly fastened to the stacked first plate-shaped workpiece and second plate-shaped workpiece.

DESCRIPTION OF PREFERRED EMBODIMENTS

The following describes one embodiment of a piercing nut fastening method according to the present invention in detail based on the drawings.

<Structure of Piercing Nut>

Figure 1:
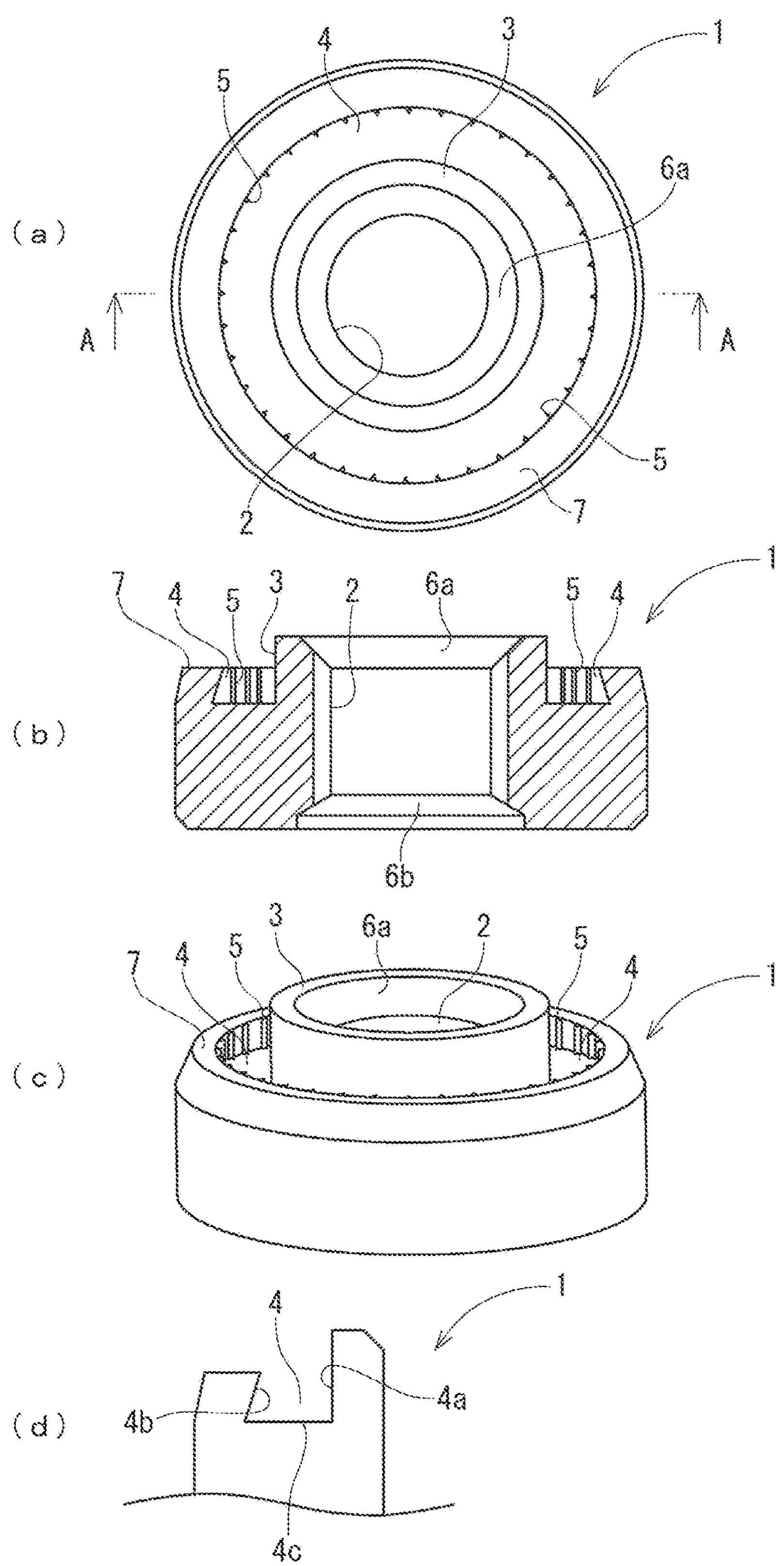
FIG. 1 is an explanatory view illustrating a piercing nut (a is a plan view, b is a cross-sectional view taken along a line A-A of a, c is a perspective view, and d is a vertical end view of a part at which a circumferential cavity is provided).

FIG. 1 illustrates a piercing nut installed to a stacked body of a plurality of plate-shaped workpieces. A piercing nut 1 is made of a metal (for example, iron) and integrally formed in a flat columnar shape (cylindrical shape) with a columnar screw insertion hole 2 drilled in the center, and has a predetermined size (diameter=about 14.5 mm×height=about 6.0 mm). A screw groove (not illustrated) is threaded on an inner peripheral surface of the screw insertion hole 2, and tapered surfaces 6*a*, 6*b* for facilitating threaded engagement with a screw (not illustrated) are formed at upper end edge and a lower end edge of the screw insertion hole 2.

A peripheral portion in the upper side of the screw insertion hole 2 projects upward with respect to the other portion, and forms a cylindrical portion 3 having a constant thickness. Then, in the outer peripheral portion in the lower side of the cylindrical portion 3, a circumferential cavity 4 having a vertical cross-section in a dovetail groove shape (groove shape in which the lower portion is wider than the upper portion) is formed.

The circumferential cavity 4 has a vertical inner wall surface 4*a* in the inner side, and an inner wall surface 4*b* inclined with an angle of about 15° with respect to the vertical direction (inclined outward from the upper side toward the lower side) in the outer side. Then, a horizontal bottom surface 4*c* having a constant width is formed between a lower end of the inner wall surface 4*a* in the inner side and a lower end of the inner wall surface 4*b* in the outer side.

On the inner wall surface 4*b* in the outer side, a plurality of anti-rotation ribs 5, 5 . . . having horizontal cross-sectional surfaces in triangular shape are vertically disposed at regular intervals. In addition, the upper portion of the outer peripheral surface of the piercing nut 1 is, similarly to the inner wall surface 4*b* in the outer side of the circumferential cavity 4, inclined by an angle of about 15° with respect to the vertical direction (inclined outward from the upper side toward the lower side), and a portion between the inclined surface and the inner wall surface 4*b* in the outer side of the circumferential cavity 4 forms an outer tubular portion 7.

<Structure of Clinching Die>

Figure 2:
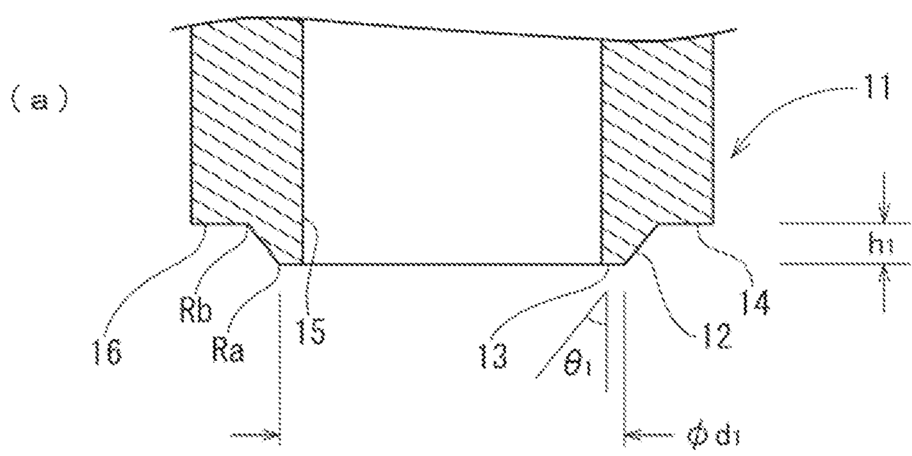
FIG. 2 is an explanatory view (vertical cross-sectional view) illustrating distal end portions of clinching dies (a illustrates a first clinching die, and b illustrates a second clinching die).
Figure 2:
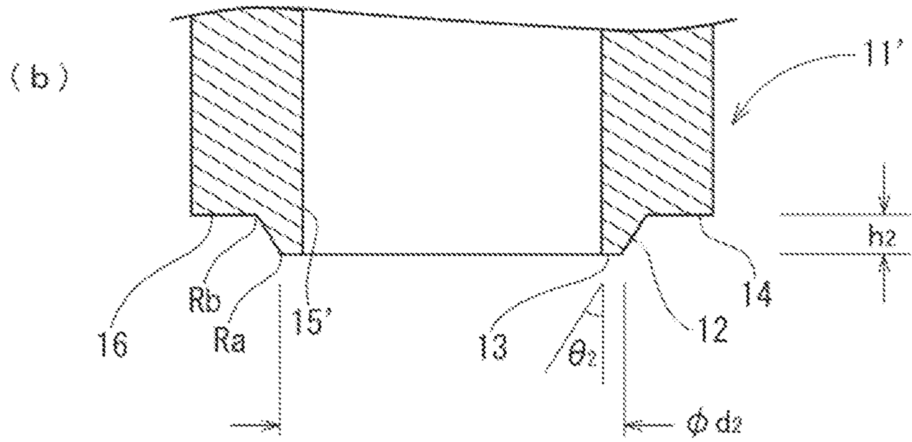

Meanwhile, FIG. 2 illustrates two types of clinching dies used for fastening (clinching to install) the piercing nut 1 to the stacked body of plate-shaped workpieces. A first clinching die 11 used in a first clinching step is made of a metal (iron), and formed in a columnar shape (cylindrical shape) with an insertion hole 15 for inserting the cylindrical portion 3 of the piercing nut 1 provided by drilling in the center. The insertion hole 15 has an inner diameter approximately the same as an outer diameter of the cylindrical portion 3 of the piercing nut 1. Then, a distal end edge (lower end edge) portion of the first clinching die 11 is formed in an approximately truncated cone shape (inverted truncated cone shape) smaller than the other portion in diameter.

That is, the first clinching die 11 is provided with a step 16 having the outer peripheral edge penetrating into the inner side at a position above from the lower end by a predetermined height. Then, the portion below the step 16 is formed in an approximately truncated cone shape having a predetermined height $h_1$, and a lower end surface 13 is formed in a horizontal ring shape (doughnut shape) with a constant width having a predetermined outer diameter $\varphi d_1$. A ring-shaped (doughnut-shaped) horizontal surface 14 with a constant width is formed at a base end (upper end) of the truncated cone shaped-portion. Furthermore, an outer peripheral surface of the truncated cone shaped-portion is a tapered surface 12 inclined inward from the upper side toward the lower side, and is inclined by a predetermined angle $\theta_1$ (for example, 20°) with respect to the vertical direction. In addition, outer peripheral edges of the distal end and the base end of the truncated cone shaped-portion are chamfered to have predetermined curvature radii Ra, Rb, respectively.

A second clinching die 11' used in a second clinching step is made of a material similar to that of the first clinching die 11, and formed in a columnar shape (cylindrical shape) having a distal end edge portion in a truncated cone shape. However, the shape of the truncated cone shaped-portion at the distal end edge is slightly different from that of the first clinching die 11. That is, in the second clinching die 11', according to the plate thickness of the second plate-shaped workpiece and the shape of the first plate-shaped workpiece extended by the first clinching die 11, a height $h_2$ of the truncated cone shaped-portion can be decreased by a predetermined height compared with the height $h_1$ of the truncated cone shaped-portion of the first clinching die 11, or an outer diameter $\varphi d_2$ of a lower end surface 13 of the truncated cone shaped-portion can be decreased by a predetermined diameter compared with the outer diameter $\varphi d_1$ of the lower end surface 13 of the truncated cone shaped-portion of the first clinching die 11. Furthermore, in the second clinching die 11', an inclination angle $\theta_2$ of a tapered surface 12 can be decreased by a predetermined angle compared with an inclination angle $\theta_1$ of the tapered surface 12 of the first clinching die 11. Outer peripheral edges of a distal end and a base end of the truncated cone shaped-portion of the second clinching die 11' are, similarly to those of the first clinching die 11, chamfered to have predetermined curvature radii Ra, Rb, respectively.

<Piercing Nut Fastening Method>

Figure 3:
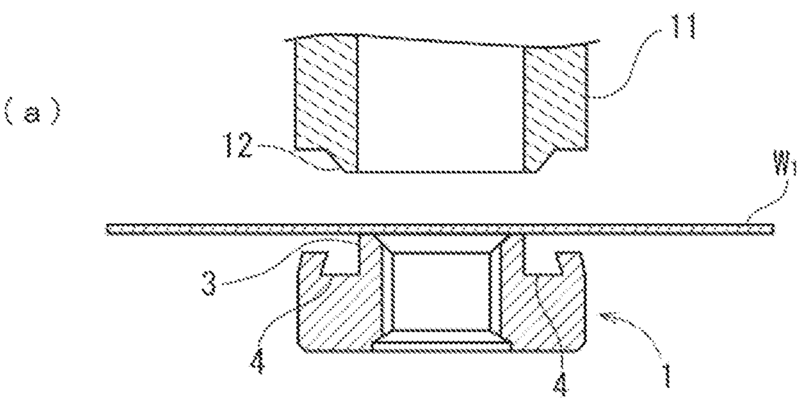
FIG. 3 is an explanatory view (vertical cross-sectional view) illustrating a state of fastening the piercing nut to two stacked plate-shaped workpieces (bracket and washer).
Figure 3:
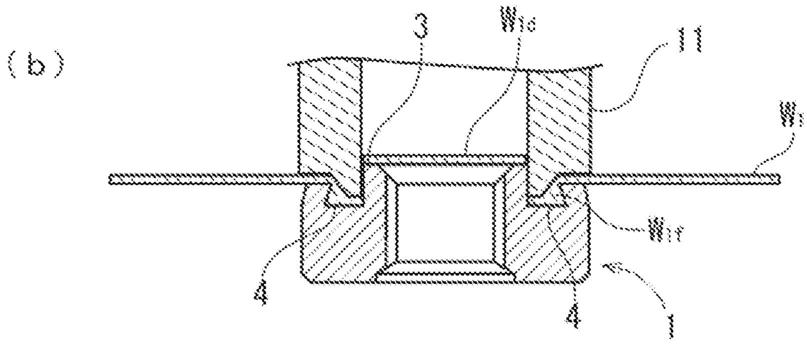
Figure 3:
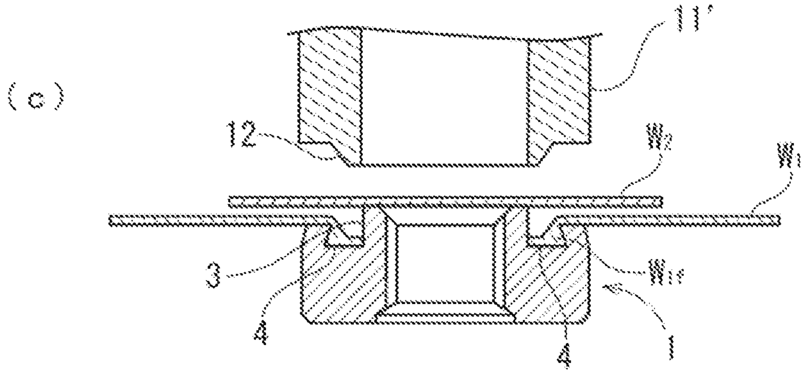
Figure 3:
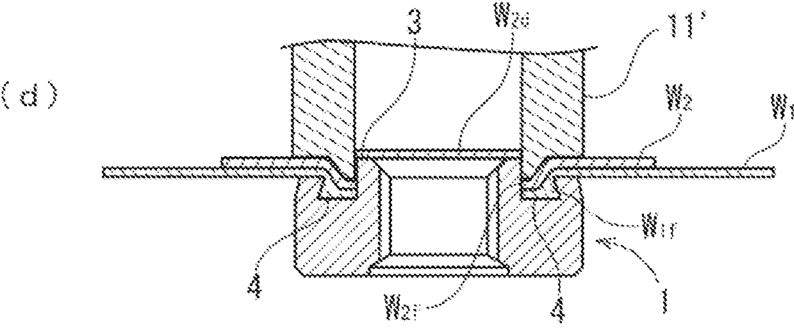

FIG. 3 illustrates an example of a fastening method to the two stacked plate-shaped workpieces (stacked body) using the piercing nut 1 (example of fastening a bracket $W_1$ having a thickness of 1.2 mm and a washer $W_2$ having a thickness of 0.8 mm to the piercing nut 1). When the piercing nut 1 is fastened to the two stacked plate-shaped workpieces $W_1$, $W_2$, a pressure device, such as a crank press, is used. As illustrated in FIG. 3(*a*), the first clinching die 11 is set to the pressure device such that the truncated cone shaped-portion at the distal end edge is positioned in the lower side. Furthermore, the first plate-shaped workpiece $W_1$ (bracket) is located under the first clinching die 11 located as described above such that the plate surface becomes horizontal, and the piercing nut 1 is located and secured under the first plate-shaped workpiece $W_1$ in a state where the opening side of the circumferential cavity 4 is opposed such that the cylindrical portion 3 becomes concentric with the insertion hole 15 of the first clinching die 11.

Furthermore, after the piercing nut 1 is located to be opposed to the first clinching die 11 across the first plate-shaped workpiece $W_1$ as described above, the first clinching die 11 is driven into the first plate-shaped workpiece $W_1$ and the piercing nut 1 from the upper side with a predetermined pressure as illustrated in FIG. 3(*b*). Then, a circular portion of the first plate-shaped workpiece $W_1$ abutting on the cylindrical portion 3 of the piercing nut 1 is punched out, and a peripheral portion of the punched portion ($W_{1d}$) is extended in the circumferential cavity 4 of the piercing nut 1, thereby fastening the piercing nut 1 to the first plate-shaped workpiece $W_1$ (first clinching step).

After the piercing nut 1 is fastened to the first plate-shaped workpiece $W_1$ by the first clinching step as described above, the first clinching die 11 installed to the pressure device is removed, and the second clinching die 11' is installed in the similar posture (that is, the second clinching die 11' is located such that an insertion hole 15' becomes concentric with the cylindrical portion 3 of the piercing nut 1). Thereafter, as illustrated in FIG. 3(*c*), the second plate-shaped workpiece $W_2$ (washer) is located on the upper side of the cylindrical portion 3 of the piercing nut 1 fastened to the first plate-shaped workpiece $W_1$ by the first clinching step such that the plate surface becomes horizontal.

Then, after the second plate-shaped workpiece $W_2$ is located on the upper side of the piercing nut 1 as described above, as illustrated in FIG. 3(*d*), the second clinching die 11' is driven into the second plate-shaped workpiece $W_2$ from the upper side with a predetermined pressure. Then, a circular portion of the second plate-shaped workpiece $W_2$ abutting on the cylindrical portion 3 of the piercing nut 1 is punched out, and a peripheral portion of the punched portion ($W_{2d}$) is extended above an extended portion $W_{1f}$ of the first plate-shaped workpiece $W_1$ in the circumferential cavity 4 of the piercing nut 1, thereby fastening the piercing nut 1 to the second plate-shaped workpiece $W_2$ (second clinching step).

Figure 4:
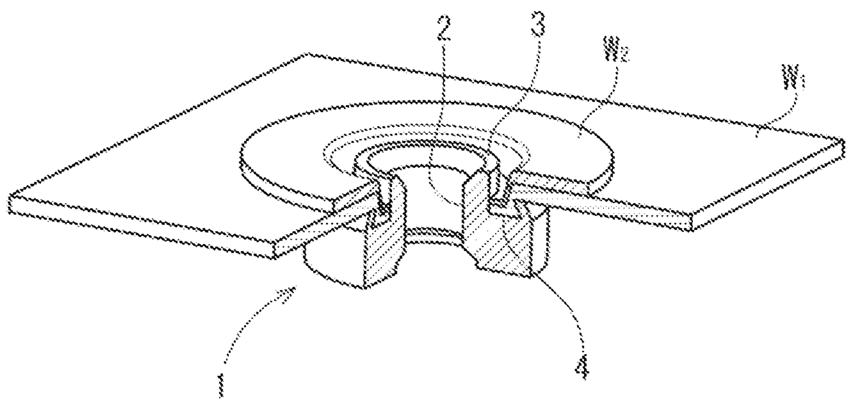
FIG. 4 is an explanatory view (perspective view of a partially notched state) illustrating a state in which the piercing nut is fastened to the two stacked plate-shaped workpieces (bracket and washer).
Figure 5:
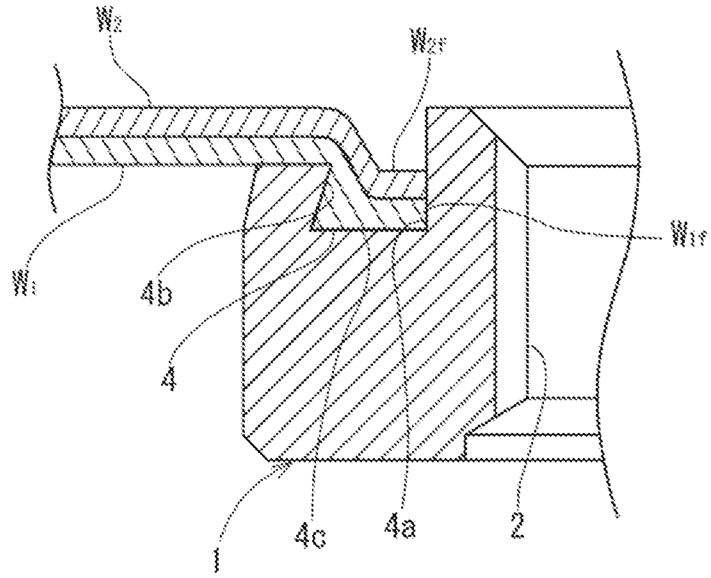
FIG. 5 is an explanatory view (vertical cross-sectional view) illustrating an enlarged part at which the circumferential cavity of the piercing nut fastened to the two stacked plate-shaped workpieces (bracket and washer) is provided.

FIG. 4 is a schematic diagram illustrating a state where the piercing nut 1 is fastened to the first plate-shaped workpiece $W_1$ (bracket) and the second plate-shaped workpiece $W_2$ (washer), and FIG. 5 is a schematic diagram illustrating a part at which the circumferential cavity 4 of the piercing nut 1 is provided. In the circumferential cavity 4 of the piercing nut 1 fastened to the first plate-shaped workpiece $W_1$ and the second plate-shaped workpiece $W_2$, the peripheral area of the punched portion of the first plate-shaped workpiece $W_1$ is extended over the inner wall surface 4*a* in the inner side, the inner wall surface 4*b* in the outer side, and the bottom surface 4*c* of the circumferential cavity 4 without forming a gap (extended portion $W_{1f}$). Then, on the upper side of the extended portion $W_{1f}$ of the first plate-shaped workpiece $W_1$, the peripheral area of the punched portion of the second plate-shaped workpiece $W_2$ is extended without being broken or the like (extended portion $W_{2f}$), and its distal end reaches the inner wall surface 4*a* in the inner side of the circumferential cavity 4.

<Effect of Piercing Nut Fastening Method>

The above-described fastening method of the piercing nut 1 includes: the first clinching step of fastening the piercing nut 1 to the first plate-shaped workpiece $W_1$ by punching the first plate-shaped workpiece $W_1$ in a circular shape and extending the peripheral area of the punched portion in the circumferential cavity 4 of the piercing nut 1; and the second clinching step of punching the second plate-shaped workpiece $W_2$ in a circular shape and extending the peripheral area of the punched portion on the outside of the extended portion $W_{1f}$ of the first plate-shaped workpiece $W_1$ in the circumferential cavity 4 of the piercing nut 1. Accordingly, with the fastening method of the piercing nut 1, a situation where the peripheral area of the punched portion of the second plate-shaped workpiece $W_2$ is not sufficiently extended in the circumferential cavity 4 of the piercing nut 1, a situation where the distal end of the extended portion War is broken, or a situation where the joint of the extended portion $W_{1f}$ of the first plate-shaped workpiece $W_1$ and the extended portion War of the second plate-shaped workpiece $W_2$ is insufficient does not occur. Therefore, the piercing nut 1 can be strongly fastened to the stacked first plate-shaped workpiece $W_1$ and second plate-shaped workpiece $W_2$ so as to develop a high idling torque and a high clinching force.

In the above-described fastening method of the piercing nut 1, both the first clinching die 11 and the second clinching die 11' have the distal end side formed in the truncated cone shape, and therefore, in the first clinching step and the second clinching step, the peripheral areas of the punched portions of the first plate-shaped workpiece $W_1$ and the second plate-shaped workpiece $W_2$ can be extended in the circumferential cavity 4 of the piercing nut 1 smoothly without being broken and without forming a gap. Accordingly, the piercing nut 1 can be more strongly fastened to the stacked first plate-shaped workpiece $W_1$ and second plate-shaped workpiece $W_2$.

Furthermore, in the above-described fastening method of the piercing nut 1, the inclination angle $\theta_2$ of the peripheral surface of the truncated cone shaped-portion of the second clinching die 11' with respect to the vertical direction is smaller than the inclination angle $\theta_1$ of the peripheral surface of the truncated cone shaped-portion of the first clinching die 11, and the peripheral area of the punched portion of the second plate-shaped workpiece $W_2$ can penetrate deep into the circumferential cavity 4 of the piercing nut 1 in the second clinching step. Therefore, the peripheral area of the punched portion of the second plate-shaped workpiece $W_2$ can be more smoothly extended on the outside of the extended portion $W_{1f}$ of the first plate-shaped workpiece $W_1$ so as to have a sufficient width. Accordingly, the fastening method of the piercing nut 1 can considerably strongly fasten the piercing nut 1 to the stacked first plate-shaped workpiece $W_1$ and second plate-shaped workpiece $W_2$.

In addition, in the above-described fastening method of the piercing nut 1, the outer diameter $\varphi d_2$ of the distal end surface of the second clinching die 11' is smaller than the outer diameter $\varphi d_1$ of the distal end surface of the first clinching die 11, and the peripheral area of the punched portion of the second plate-shaped workpiece $W_2$ can penetrate deeper into the circumferential cavity 4 of the piercing nut 1 in the second clinching step. Therefore, the peripheral area of the punched portion of the second plate-shaped workpiece $W_2$ can be considerably smoothly extended on the outside (upper side) of the extended portion $W_{1f}$ of the first plate-shaped workpiece $W_1$. Accordingly, the fastening method of the piercing nut 1 can extremely strongly fasten the piercing nut 1 to the stacked first plate-shaped workpiece $W_1$ and second plate-shaped workpiece $W_2$.

<Modification of Piercing Nut Fastening Method>

The piercing nut fastening method according to the present invention is not limited to the aspect of the above-described embodiment at all, and the configuration of plate-shaped workpiece, stacked body, piercing nut, material, shape, structure, or size of clinching die, or the like can be appropriately changed as necessary without departing from the gist of the present invention.

For example, the piercing nut fastening method according to the present invention is not limited to the method in which the clinching die is driven from the upper side of the plate-shaped workpiece as described above in the embodiment, and a method in which the piercing nut is installed on the upper side of the plate-shaped workpiece installed on the upper side of the clinching die, and the clinching die is driven upward to the secured piercing nut, or the piercing nut is driven to the secured clinching die may be employed.

Figure 6:
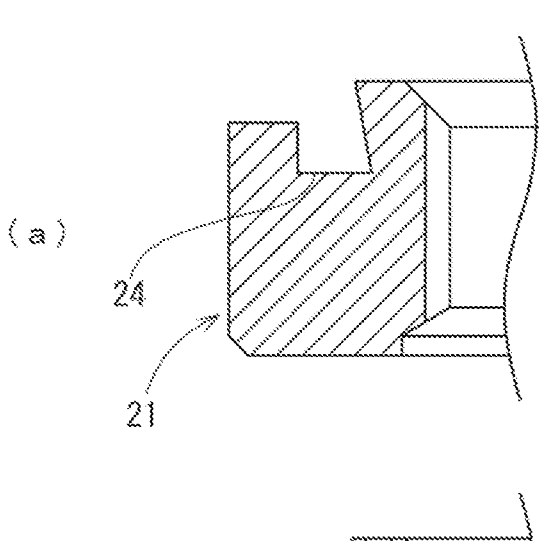
FIG. 6 is an explanatory view (vertical cross-sectional views of a part at which a circumferential cavity is provided) illustrating modifications of the piercing nut.
Figure 6:
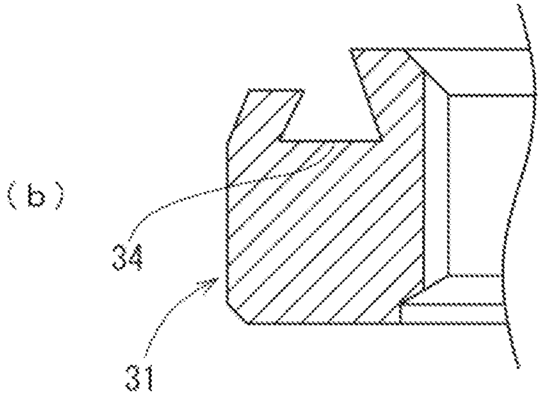
Figure 6:
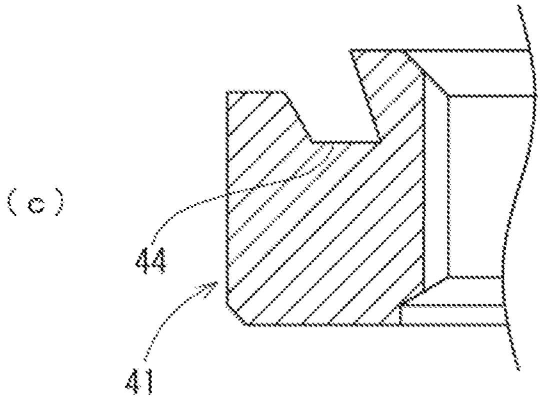

In the piercing nut fastening method according to the present invention, the circumferential cavity of the piercing nut is not limited to the dovetail groove shape having the inclined inner wall surface in the outer side as described above in the embodiment, and can be changed to a dovetail groove having the inner wall surface in the inner side inclined to narrow downward (that is, the cylindrical portion is gradually decreased in diameter from the upper side to the lower side) as illustrated in FIG. 6(*a*), a dovetail groove having the inner wall surface in the inner side inclined to narrow downward (that is, the cylindrical portion is gradually decreased in diameter from the upper side to the lower side) and the inner wall surface in the outer side is inclined to expand downward (inclined to be gradually increased in diameter from the upper side to the lower side) as illustrated in FIG. 6(*b*), or a groove shape having the inner wall surface in the inner side inclined to narrow downward (that is, the cylindrical portion is gradually decreased in diameter from the upper side to the lower side) and the inner wall surface in the outer side is inclined to narrow downward (inclined to be gradually decreased in diameter from the upper side to the lower side) as illustrated in FIG. 6(*c*).

Furthermore, the piercing nut fastening method according to the present invention is not limited to the method in which the shape of the second clinching die used in the second clinching step is different from the shape of the first clinching die used in the first clinching step as described above in the embodiment, and can be changed to a method in which the shape of the second clinching die is same as the shape of the first clinching die.

The piercing nut fastening method according to the present invention is not limited to the method in which the height and the angle of the truncated cone shaped-portion of the second clinching die used in the second clinching step are smaller than the height and the angle of the truncated cone shaped-portion of the first clinching die used in the first clinching step as described above in the embodiment, and can be changed to a method in which the height and the angle of the truncated cone shaped-portion of the second clinching die are same as the height and the angle of the truncated cone shaped-portion of the first clinching die. Note that when the height and the angle of the truncated cone shaped-portion of the second clinching die are configured to be larger than the height and the angle of the truncated cone shaped-portion of the first clinching die as described above in the embodiment, the peripheral area of the punched portion of the second plate-shaped workpiece can more deeply penetrate into the circumferential cavity of the piercing nut. Therefore, there is an advantage in that the peripheral area of the punched portion of the second plate-shaped workpiece can be more smoothly extended on the outside of the extended portion of the first plate-shaped workpiece in the circumferential cavity of the piercing nut so as to have a sufficient width, and further, the extended portion of the first plate-shaped workpiece can be further extended (so as to have a sufficient width) without bending or breaking the second plate-shaped workpiece.

In addition, the piercing nut fastening method according to the present invention is not limited to the method in which the piercing nut is fastened to the stacked bracket and washer as described above in the embodiment, and can be applied to a case where a piercing nut is fastened to a stacked body in which various kinds of a plurality of (two or more) plate-shaped workpieces are stacked.

When the piercing nut fastening method according to the present invention is used in a case where a piercing nut is fastened to a stacked body in which three plate-shaped workpieces are stacked, a method in which, after the first clinching step and the second clinching step are performed as described above in the embodiment, a third clinching step is performed on a third plate-shaped workpiece using a third clinching die the same as the second clinching die or having the smaller inclination angle and the narrower distal end width than the second clinching die can be employed. Alternatively, after the first clinching step is performed with two stacked plate-shaped workpieces as the first plate-shaped workpiece and a piercing nut is fastened thereto, another one plate-shaped workpiece can be stacked on the (two stacked) first plate-shaped workpieces as a second plate-shaped workpiece, and the second clinching step can be performed on the second plate-shaped workpiece.

In addition, the same applies to a case where the piercing nut fastening method according to the present invention is used when a piercing nut is fastened to a stacked body in which four or more plate-shaped workpieces are stacked. A method in which the clinching step is sequentially performed for each plate-shaped workpiece and to the piercing nut is fastened thereto can be employed. Alternatively, the clinching step (first clinching step) can be performed on a stacked body in which a plurality of plate-shaped workpieces are stacked at once to fasten the piercing nut to the stacked body, and then, another one plate-shaped workpiece can be stacked on the (plurality of stacked) first plate-shaped workpieces as a second plate-shaped workpiece, and the second clinching step can be performed on the second plate-shaped workpiece.

The piercing nut fastening method according to the present invention is not limited to the method in which the piercing nut is fastened to a plurality of plate-shaped workpieces having the same thickness as described above in the embodiment, and the piercing nut may be fastened to a plurality of plate-shaped workpieces having different thicknesses. Note that there is an advantage also in that when the piercing nut is fastened to the two stacked plate-shaped workpieces, the fastening force of the piercing nut to the stacked body becomes higher even with the thickness of the second plate-shaped workpiece adjusted to 50% to 80% of the thickness of the first plate-shaped workpiece.

INDUSTRIAL APPLICABILITY

The piercing nut fastening method according to the present invention provides the excellent effect as described above, and therefore, can be appropriately used as a method for fastening a piercing nut to a stacked body in which a plurality of plate-shaped workpieces are stacked.

DESCRIPTION OF REFERENCE SIGNS

1, 21, 31, 41 . . . Piercing nut
2 . . . Screw insertion hole
3 . . . Cylindrical portion
4, 24, 34, 44 . . . Circumferential cavity
11 . . . First clinching die
11' . . . Second clinching die
12 . . . Tapered surface

The invention claimed is:

1. A fastening method for fastening a flat column-shaped piercing nut to a stacked body in which a plurality of plate-shaped workpieces are stacked, the piercing nut having a center provided with a cylindrical portion, a circumferential cavity being formed on a peripheral area of the cylindrical portion, the method comprising:

a first clinching step of fastening the piercing nut to a first plate-shaped workpiece by locating the piercing nut on one surface side of the first plate-shaped workpiece in a state of being opposed to an opening side of the circumferential cavity, driving a clinching die with a tubular distal end surface from another surface side of the first plate-shaped workpiece to punch out the first plate-shaped workpiece in a circular shape, and extending a peripheral area of the punched portion in the circumferential cavity of the piercing nut; and a second clinching step of stacking a second plate-shaped workpiece on the one surface side of the first plate-shaped workpiece to which the piercing nut is fastened in the first clinching step, subsequently, driving a clinching die with a tubular distal end surface from the side in which the second plate-shaped workpiece is stacked to punch out the second plate-shaped workpiece in a circular shape, and extending a peripheral area of the punched portion on an outside of the extended portion of the first plate-shaped workpiece in the circumferential cavity of the piercing nut.

2. The method for fastening a piercing nut to a stacked body of plate-shaped workpieces according to claim 1, wherein the clinching die used in the first clinching step and/or the second clinching step has a distal end side formed in a truncated cone shape.

3. The method for fastening a piercing nut to a stacked body of plate-shaped workpieces according to claim 2, wherein an inclination angle with respect to a vertical direction of a peripheral surface of the truncated cone shaped-portion of the clinching die used in the second clinching step is smaller than an inclination angle with respect to the vertical direction of a peripheral surface of the truncated cone shaped-portion of the clinching die used in the first clinching step.

4. The method for fastening a piercing nut to a stacked body of plate-shaped workpieces according to claim 3, wherein an outer diameter of the distal end surface of the clinching die used in the second clinching step is smaller than an outer diameter of the distal end surface of the clinching die used in the first clinching step.

5. The method for fastening a piercing nut to a stacked body of plate-shaped workpieces according to claim 2, wherein an outer diameter of the distal end surface of the clinching die used in the second clinching step is smaller than an outer diameter of the distal end surface of the clinching die used in the first clinching step.

* * * * *